US005883313A

United States Patent [19]

Ercole et al.

[11] Patent Number: 5,883,313

[45] Date of Patent: Mar. 16, 1999

[54] PART MEASURING GAUGE

[75] Inventors: Maurizio Ercole; Enrico Garau, both of Turin, Italy

[73] Assignee: DEA-Brown & Sharpe S.p.A., Italy

[21] Appl. No.: 734,028

[22] Filed: Oct. 18, 1996

[30] Foreign Application Priority Data

Oct. 6, 1995 [IT] Italy .................................. T095A0805

[51] Int. Cl.[6] ................................................ G01M 19/00

[52] U.S. Cl. ............................ 73/865.8; 33/552; 33/557; 33/560; 33/504

[58] Field of Search ............................ 73/865.8, 5, 1.79, 73/1.81; 33/552, 557, 558, 560, 561, 503, 504

[56] References Cited

U.S. PATENT DOCUMENTS

| | | | |
|---|---|---|---|
| 2,995,825 | 8/1961 | Sakaitis et al. | 33/560 |
| 4,221,053 | 9/1980 | Bobel, II et al. | 33/552 |
| 4,400,884 | 8/1983 | Baresh et al. | 33/175 |
| 4,848,005 | 7/1989 | Ercole et al. | 33/568 |
| 4,953,306 | 9/1990 | Weckenmann et al. | 33/552 |
| 5,193,286 | 3/1993 | Collier | 33/552 |
| 5,426,862 | 6/1995 | Ham et al. | 33/548 |
| 5,460,058 | 10/1995 | Shadoian | 73/865.8 |
| 5,625,959 | 5/1997 | Ercole et al. | 33/568 |
| 5,640,779 | 6/1997 | Rouloff et al. | 33/552 |

FOREIGN PATENT DOCUMENTS

| | | | |
|---|---|---|---|
| 317502 | 5/1989 | European Pat. Off. . | |
| 2441580 | 6/1980 | France . | |
| 3611905 | 10/1987 | Germany . | |
| 996009 | 6/1965 | United Kingdom | 33/557 |
| 2167559 | 6/1988 | United Kingdom . | |

OTHER PUBLICATIONS

26 Mar. 1998 French Preliminary Search Report (with English translation).

*Primary Examiner*—Hezron Williams
*Assistant Examiner*—Nashmiya Fayyaz
*Attorney, Agent, or Firm*—Hall, Priddy & Myers

[57] ABSTRACT

A gauge for measuring parts and presenting a number of reconfigurable supporting elements, each having a first portion positionable on a reference surface, and a second portion positionable in relation to the first portion in a direction perpendicular to the reference surface; and a number of orientable measuring modules, each fitted to the second portion of a respective supporting element and presenting a respective linear position transducer; the supporting elements and respective measuring modules being so arranged as to define a number of discrete points for supporting the part for measurement; and each transducer detecting any departure of the actual position of a respective point of the part from a theoretical reference position of the point.

4 Claims, 5 Drawing Sheets

PART MEASURING GAUGE

BACKGROUND OF THE INVENTION

The present invention relates to a gauge for measuring parts, and particularly, though not exclusively, for determining the contour of a sheet.

The present invention is particularly, though not exclusively, suitable for measuring automotive glass, to which application reference is made herein purely by way of example.

Gauges for measuring automotive glass are known, which substantially comprise a rigid structure with a peripheral supporting band corresponding to the theoretical contour of the glass; and the band, on which the glass is placed, is equipped with a number of appropriately spaced position transducers connected to a data processing system and for detecting any departure of the corresponding edge points of the glass from the supporting band.

Though fast, easy to use, and therefore suitable for on-line measuring all production parts, gauges of the type briefly described above present several drawbacks.

In particular, being special-purpose fixtures of a shape strictly related to the part being measured, a special gauge is required for each part, thus resulting in considerable cost in terms of fabrication and storage of the gauges.

Moreover, the actual fabrication of each gauge is a fairly painstaking job, normally involving computer-aided machining of an aluminium alloy model or master on the basis of a computer-aided-designed mathematical model of the supporting band. A first plastic resin cast or “negative” is made from the master and, from the “negative”, a second plastic resin cast or “positive” is made to reproduce the master and which forms the rigid structure of the gauge to which the transducers are fitted.

Finally, the accuracy obtainable using the above method is fairly poor.

SUMMARY OF THE INVENTION

It is an object of the present invention to provide a part measuring gauge, particularly for measuring automotive glass, designed to overcome the aforementioned drawbacks typically associated with known gauges.

According to the present invention, there is provided a gauge for measuring parts, and of the type comprising supporting means cooperating with a part for measurement, and a number of position transducers fitted to said supporting means and cooperating with discrete points of said part to determine any departure of said points from a theoretical position; characterized in that said supporting means comprise a reference surface; a number of reconfigurable supporting elements, each presenting a first portion positionable on said reference surface, and a second portion positionable in relation to said first portion in a direction perpendicular to the reference surface; and a number of orientable measuring modules, each fitted to said second portion of a respective supporting element, and each presenting at least one respective said transducer.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
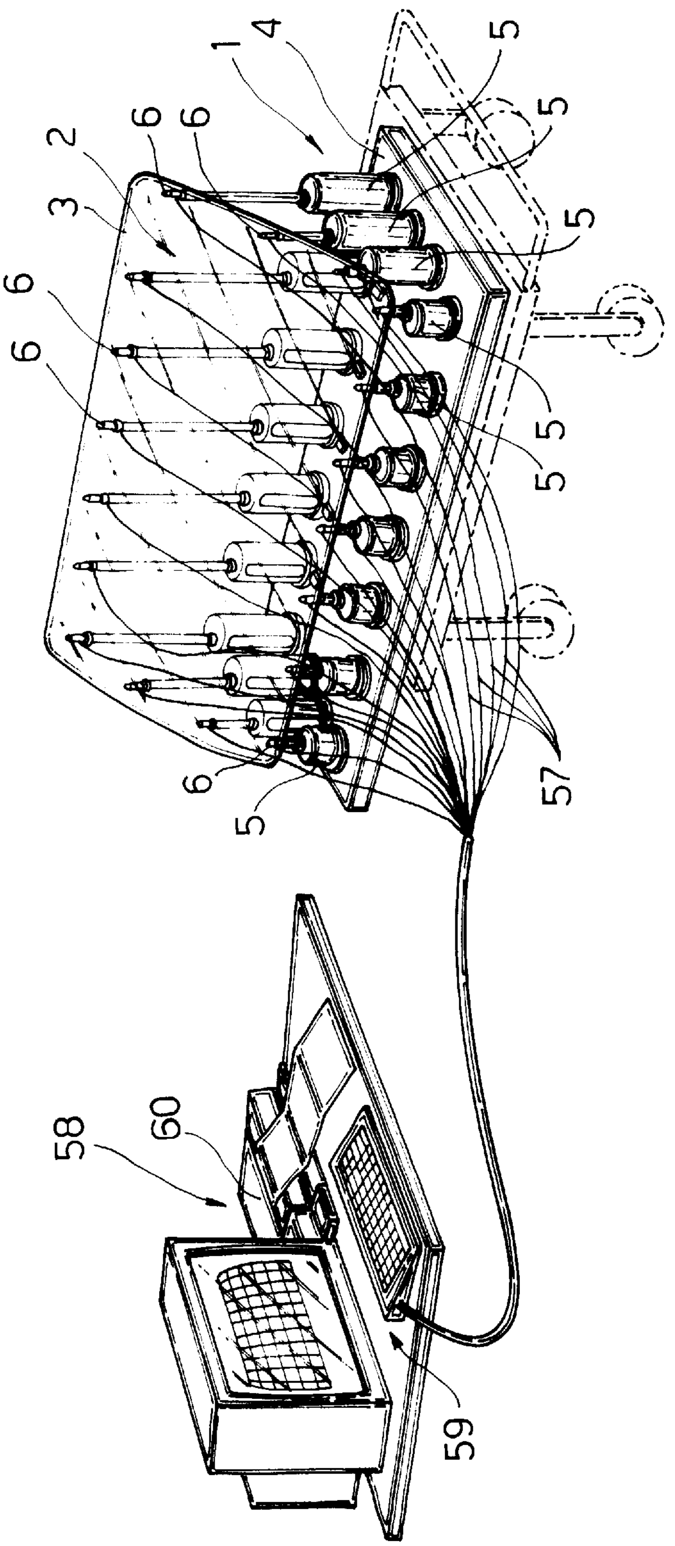
FIG. 1 shows a view in perspective of a gauge in accordance with the present invention, connected to a data processing system and presenting a pane of glass for measurement.
Figure 4:
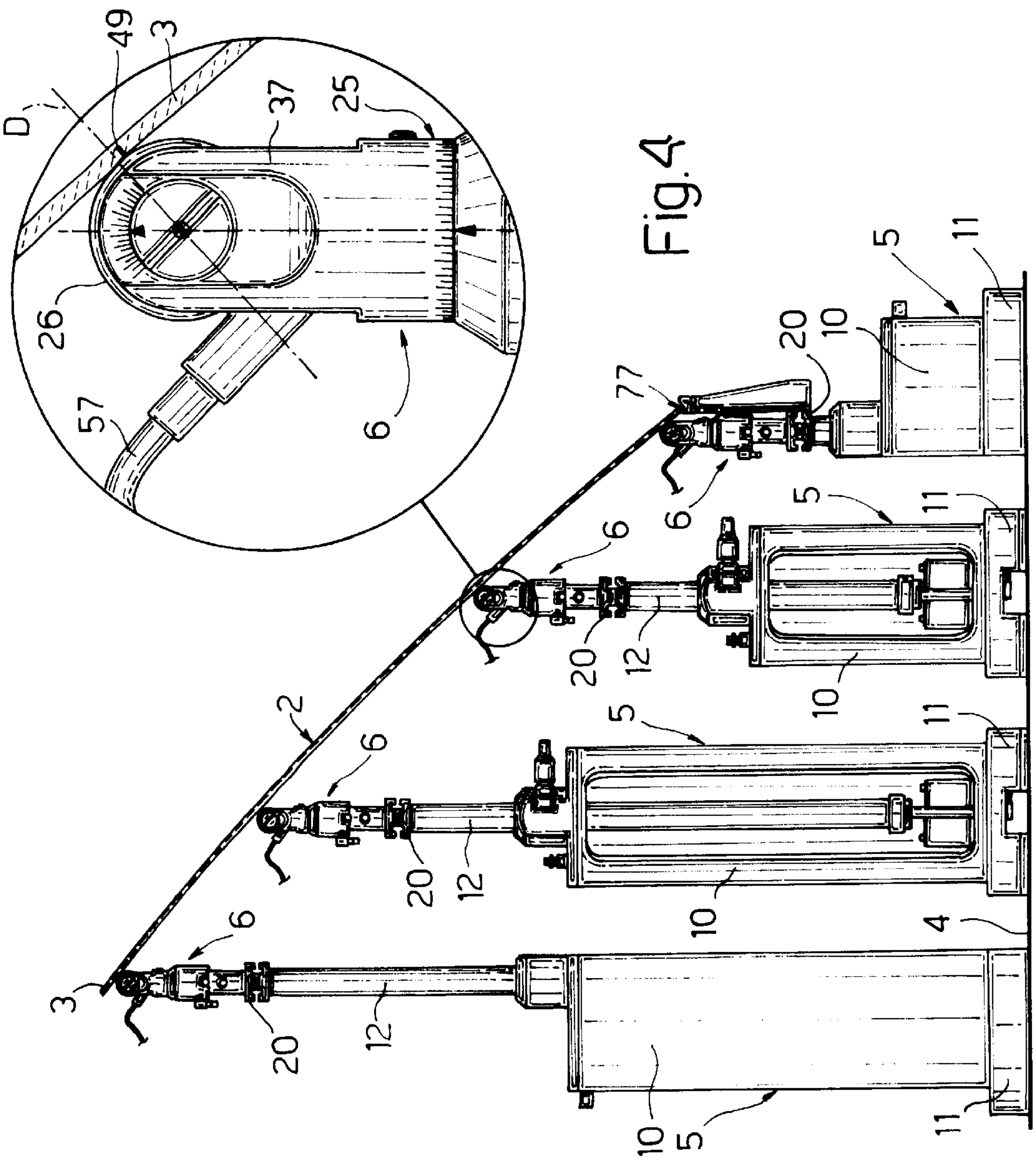
FIG. 4 shows a cross section of the FIG. 1 gauge.
Figure 3:
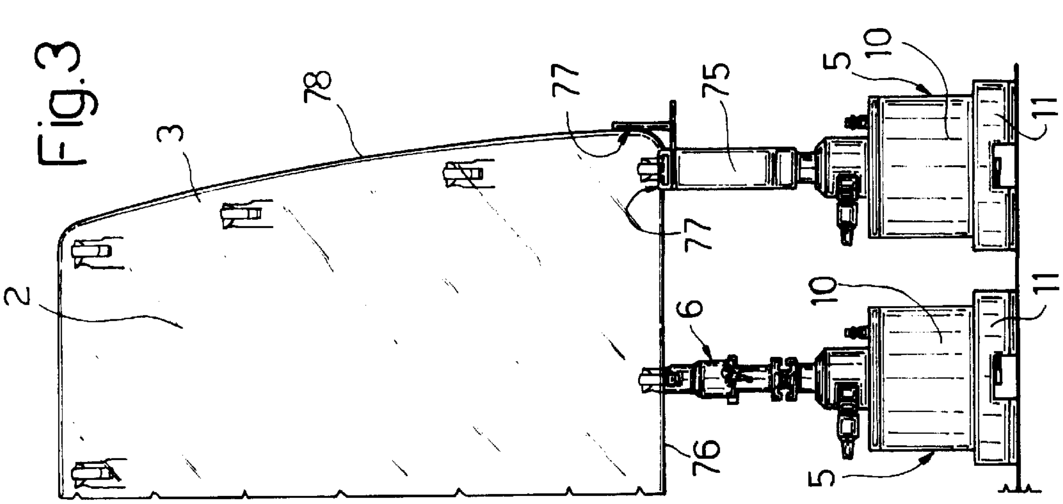
FIG. 3 shows a partial front view of the FIG. 1 gauge.
Figure 5:
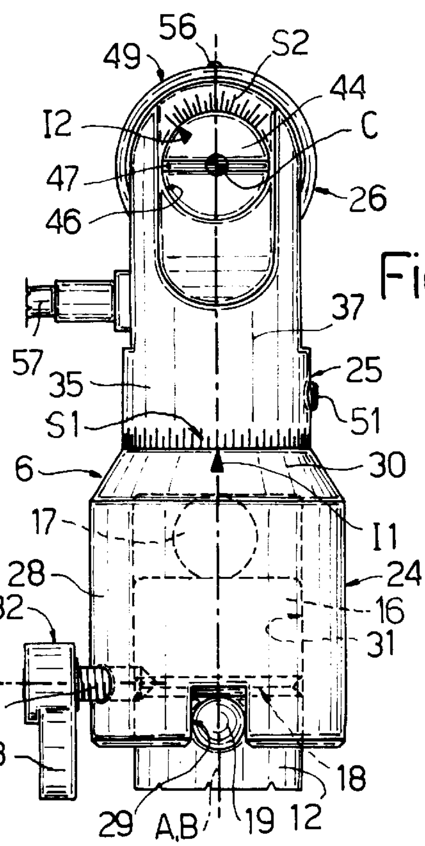
FIGS. 5, 6 and 7 show respective front, side and plan views of a measuring module of the FIG. 1 gauge.

With reference to FIGS. 1, 3 and 4, number 1 indicates a gauge for measuring panes 2 of automotive glass, and in particular for determining any geometrical errors along the edge 3 of pane 2 for fitment to the vehicle body.

Gauge 1 substantially comprises a reference surface 4; a number of reconfigurable supporting elements 5 fitted to surface 4; and a number of measuring modules 6 fitted to respective supporting elements 5 and cooperating with respective appropriately spaced points along edge 3 of pane 2.

Surface 4 conveniently presents a number of assembly holes 7 (FIG. 2) arranged in an orderly pattern, e.g. in a square-cell array, and forming the corners and center of each cell.

Each supporting element 5 substantially comprises a substantially cylindrical body 10 with a base 11 positionable on surface 4; and a rod 12 with an axis A perpendicular to surface 4, and which is housed partially and in axially-sliding manner inside body 10 to adjust the overall height of supporting element 5. Each supporting element 5 (FIG. 11*a*) also presents an anchoring device 14 for clamping base 11 to surface 4 with the aid of one of assembly holes 7; and a clamping device 15 for clamping rod 12 in relation to body 10.

Supporting elements 5, and in particular respective devices 14 and 15, are known, and therefore not described in detail, from Italian Patent Application n. 94A-000209 filed on 22 Mar., 1994, which matured into U.S. Pat. No. 5,625,959, that issued on May 6, 1997 and the content of which is incorporated herein by way of reference as required.

Figure 2:
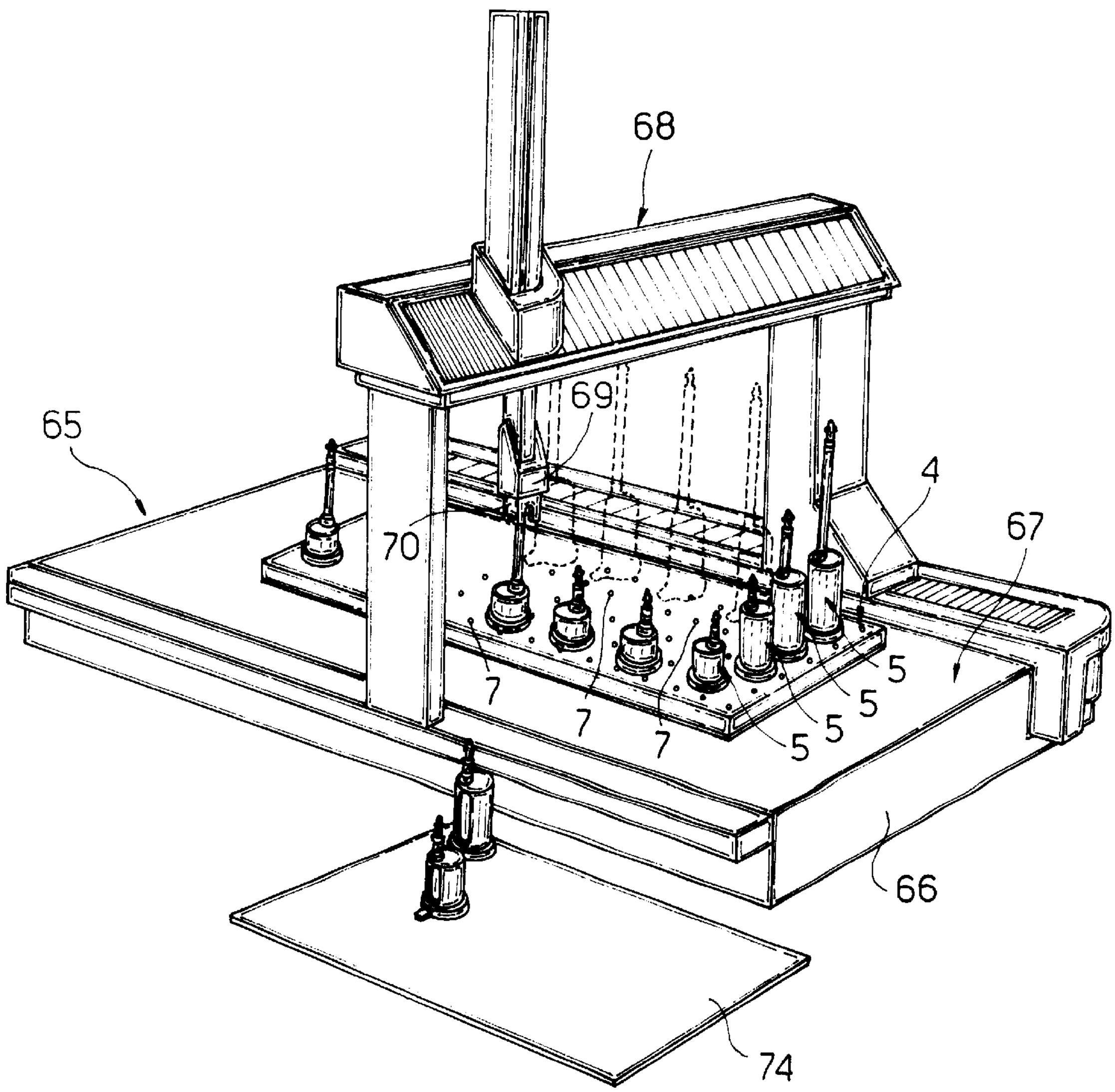
FIG. 2 shows one stage in the formation of the FIG. 1 gauge.

As shown in FIGS. 1, 2 and 4, provision may be made for various types of supporting elements 5 differing solely as regards the height of body 10 and, hence, the length and travel of rod 12, so that a wide range of heights may be covered using a small number of standard-size elements 5.

Figure 6:
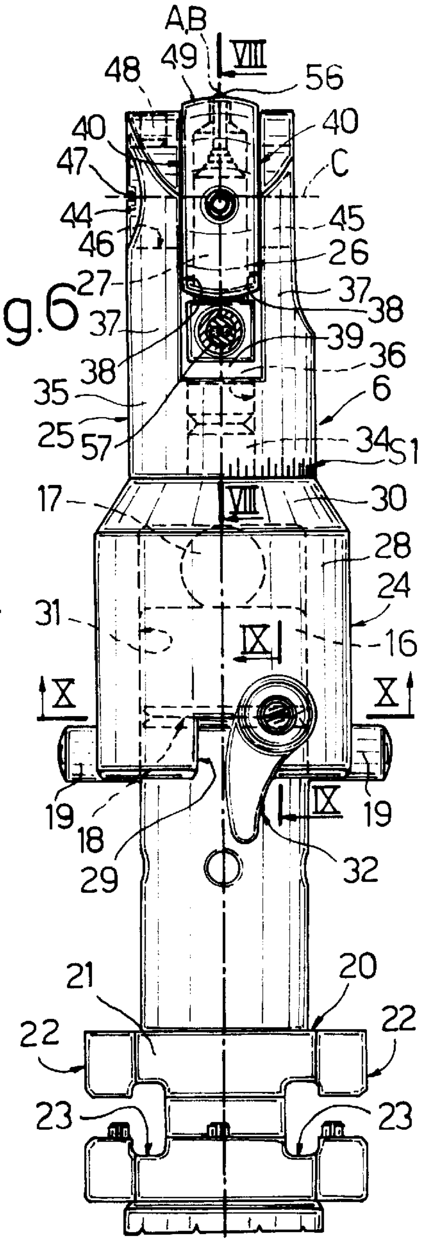

As shown more clearly in FIG. 6, the top end 16 of rod 12 of each element 5 is fitted with a spherical head 17, and, close to end 16, rod 12 presents an annular V-section groove 18 and a pair of diametrically-opposed radial appendixes 19.

Rod 12 also presents an intermediate connecting portion 20 for accessory modules 75 (FIGS. 3 and 4) for positioning pane 2 on gauge 1; which portion 20 (FIGS. 6 and 11*a*) substantially comprises a square-based parallelepiped block 21, the lateral faces 22 of which present respective T grooves 23.

FIGS. 5 to 11 show a measuring module 6, which substantially comprises a base 24 for fitment to rod 12 of a respective supporting element 5; an intermediate element 25 fitted to and rotatable in relation to base 24 about an axis B coincident, in use, with axis A of rod 12; a rest element 26 for supporting pane 2 and fitted to and rotatable in relation to intermediate element 25 about an axis C perpendicular to axis B; and a linear position transducer 27 housed inside rest element 26 and cooperating with pane 2.

More specifically, base 24 is substantially cup-shaped, and comprises a cylindrical lateral wall 28 with four radial seats 29 arranged in a cross about its free bottom edge; and a top end wall 30 defining an axial cavity 31 of axis B with wall 28, and from which extends axially upwards a cylindrical pin 34 for connection to intermediate element 25.

Figure 9:
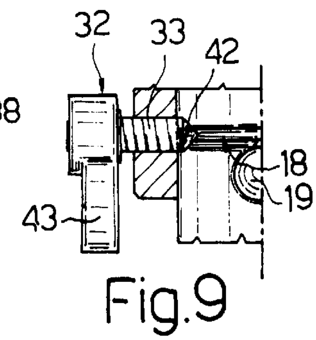
FIG. 9 shows a section along line IX—IX in FIG. 6.
Figure 10:
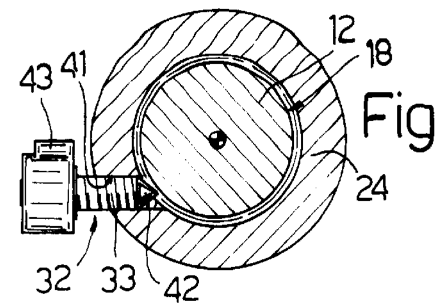
FIG. 10 shows a section along line X—X in FIG. 6.
Figure 7:
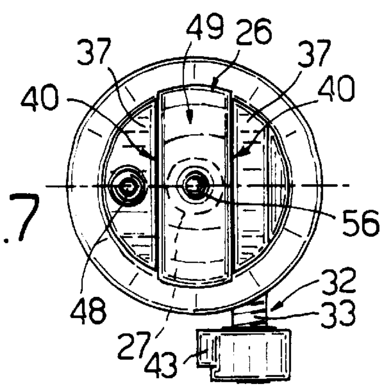

Base 24 may be clamped to rod 12 by means of a device 32 substantially comprising a pressure screw 33, which, by means of a lever 43, is screwed inside a through hole 41 in wall 28, and presents a conical tip 42 cooperating eccentrically with groove 18 (FIG. 10) and offset upwards in relation to the bottom of groove 18 (FIG. 9).

Figure 8:
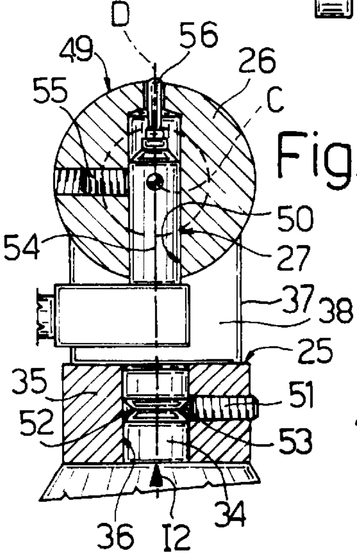
FIG. 8 shows a section along line VIII—VIII in FIG. 6.

Intermediate element 25 is substantially fork-shaped, and comprises a cylindrical bottom portion 35 with an axial hole 36 housing pin 34 in rotary manner; and a pair of vertical shoulders 37 with respective flat surfaces 38 facing each other and defining a seat 39 for housing rest element 26. Element 25 may be clamped axially and angularly in relation to base 24 by means of a radial pressure pin 51 cooperating with an annular V-section groove 52 of pin 34 and also conveniently presenting a conical tip 53 cooperating with and slightly offset upwards in relation to groove 52 (FIG. 8).

Base 24 conveniently presents a pointer I1 cooperating with a scale S1 formed on intermediate element 25 to indicate the angular position of element 25 in relation to base 24.

Rest element 26 is in the form of a spherical segment with two bases 40 symmetrical in relation to the equatorial plane of element 26 and substantially contacting surfaces 38 of shoulders 37 of intermediate element 25; respective pins 44, 45 extend from bases 40, present a common axis C perpendicular to bases 40, and are housed in rotary manner inside respective seats 46 formed in shoulders 37; and pin 44 presents a diametrical end slot 47, and is locked inside respective seat 46 by a radial pin 48 screwed into respective shoulder 37.

Pin 44 also conveniently presents a pointer I2 cooperating with a scale S2 formed about the periphery of seat 46 on respective shoulder 37 to indicate the angular position of element 26 in relation to intermediate element 25.

Element 26 presents a spherical lateral surface 49 projecting upwards in relation to shoulders 37 of intermediate element 25 and forming a support for edge 3 of pane 2 for measurement.

Element 26 also presents a diametrical cavity 50 with an axis D perpendicular to axis C, and housing transducer 27 (FIG. 8), which, being known and therefore not described in detail, comprises a fixed body 54 secured inside cavity 50 by a pressure pin 55 screwed inside a radial hole in element 26, and a feeler element 56 movable along axis D and secured by elastic means (not shown) so that its end projects from lateral surface 49 by an amount at least equal to the maximum detectable error.

Transducer 27 is connected by a cable 57 to a conventional unit 58 for collecting and processing measuring data and comprising, for example, a processor 59 and a printer 60.

FIG. 2 shows a preliminary stage in the configuration of gauge 1, and which is conveniently performed using a measuring machine 65.

Measuring machine 65, which in the example shown is a gantry type, comprises a bed 66 defining a reference surface 67; and a movable unit 68 presenting a measuring head 69 equipped with a reference tool 70—known from aforementioned Italian Patent Application n. 94A-000209 and therefore not described in detail—which cooperates in a definite mutual position with rod 12 of each supporting element 5. The measuring machine is also equipped with a control unit (not shown) for moving movable unit 68 successively and according to memorized operating sequences into a number of predetermined positions.

Supporting elements 5 are initially placed on a hold surface 74.

Reference surface 4 is positioned on bed 66 of measuring machine 65 and the configuration sequence of supporting elements 5 is started; movable unit 68 of measuring machine 65 sets reference tool 70 to a predetermined position; the operator places a supporting element 5 on reference surface 4, moves it about on surface 4 so that it is positioned substantially beneath tool 70, and then raises rod 12 by hand so that it engages tool 70; and devices 14 and 15 are activated to respectively clamp base 11 of element 5 to surface 4, and rod 12 in relation to body 10. All the above operations are illustrated in Patent Application n. 94A-000209 and therefore not described in detail.

In the same way, supporting elements 5 are all fitted to reference surface 4 with respective rods 12 adjusted to the required height and angular position (about respective axis A). In particular, the coordinates of the center of spherical head 17 and the orientation of radial appendixes 19 are determined.

Figure 11:
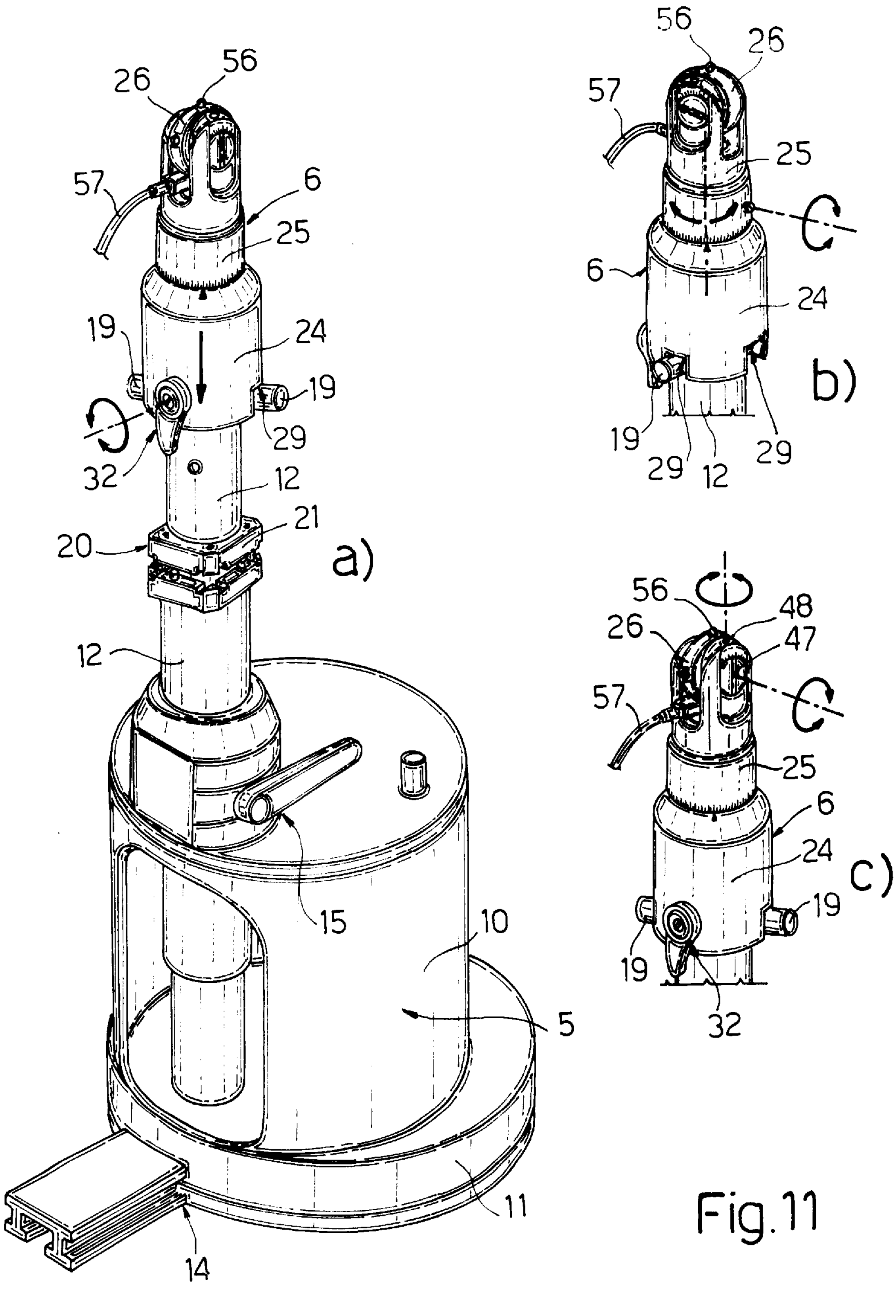
FIG. 11 shows a view in perspective of successive stages in the assembly and adjustment of the FIG. 5 supporting and measuring module on a reconfigurable supporting element forming part of the FIG. 1 gauge.

At this point, each element 5 is fitted with a measuring module 6 as shown in FIGS. 11 *a*), *b*) and *c*). First of all, module 6 is assembled axially so that base 24 engages the end of rod 12 and axially contacts spherical head 17; and the angular position of base 24 in relation to supporting element 5 is defined by appendixes 19 engaging two respective seats 29.

Base 24 is then clamped to rod 12 by simply tightening device 32, the eccentric action of screw 33 of which so torques base 24 as to rotate it to take up any circumferential clearance between appendixes 19 and respective seats 29 and so ensure repeatable angular positioning of base 24 in relation to rod 12. Moreover, by screw 33 acting on the upper conical profile of groove 18, base 24 is drawn downwards to ensure axial contact between spherical head 17 and wall 30 of base 24.

Once base 24 is fixed, the angular position of intermediate element 25 in relation to base 24 is adjusted (FIG. 11*b*) by loosening pin 51, rotating element 25 about pin 34 to the required position as shown by pointer I1 on scale S1, and clamping element 25 in position by means of pin 51.

Finally, the angular position of rest element 26 (FIG. 11*c*) about axis C is adjusted by loosening pin 48, rotating element 26 by means of an appropriate tool (not shown) inserted inside slot 47 of pin 44, and clamping element 26 in the required position as shown by pointer I2 on scale S2.

All the above operations are conveniently assisted by unit 58 supplying the operator with information (displayed or printed) relative to supporting element 5 and the relative configuration parameter values.

The above adjustments (location of base 11 on reference surface 4, position and height of rod 12, and rotation of intermediate element 25 about axis B and element 26 about axis C) are so combined as to enable element 26 to be set to any location and any position in space with axis D perpendicular to pane 2 at the point of contact with transducer 27 (enlarged detail in FIG. 4).

When supporting elements 5 are all finally configured, respective elements 26 define a number of points for supporting edge 3 of pane 2 in the exact on-vehicle position, i.e. simulate a supporting surface with which edge 3 should mate if geometrically correct.

The elements 5 located at the two vertices adjacent to the base 76 of pane 2 conveniently present elements 75 (only one shown in FIGS. 3 and 4) for positioning pane 2, and which are connected to portions 20 of respective rods 12, and define respective reference surfaces 77 for base 76 and the adjacent side 78 of pane 2.

Transducers 27 are so calibrated as to generate a zero-error signal when the respective feeler 56, under the weight of pane 2, is perfectly flush with lateral surface 49, thus indicating pane 2 cooperates correctly with surface 49.

Once configured, gauge 1 operates in exactly the same way as conventional rigid gauges.

More specifically, pane 2 is placed on the gauge so that edge 3 rests on measuring modules 6 and mates with reference surfaces 77.

If edge 3 presents any errors in relation to the theoretical contour, edge 3 fails to cooperate correctly with all of rest elements 26, and the respective transducers 27 of the non-contacted elements 26 generate a signal correlated with the value of the dimensional error at that point.

The advantages of gauge 1 according to the present invention will be clear from the foregoing description.

In particular, by comprising a number of modular supporting elements 5, gauge 1 may be reconfigured to measure different parts as opposed to only one specific part, thus eliminating the need, and hence expense, of providing a specific gauge for each part for measurement. Moreover, greater precision is achieved as compared with conventional gauges by the gauge being (re)configured using a measuring machine as a reference.

Clearly, changes may be made to gauge 1 as described and illustrated herein without, however, departing from the scope of the present invention.

For example, anchoring device 14 and clamping device 15 for clamping rod 12 of supporting element 5 may be formed in any manner, e.g. be pneumatically released. In particular, reference surface 4 may be made of ferromagnetic material with no holes, and device 14 comprise an air-cushioned pad with one or more clamping magnets.

Moreover, the present invention may be used to measure any parts, other than automotive glass, e.g. vehicle body parts. And, especially when dealing with exceptionally large parts, as opposed to placing the part on the gauge, the part may remain fixed and gauge 1 be fitted to a movable unit to bring it into contact with the part.

We claim:

1. A gauge f or measuring a plurality of differently dimensioned parts, comprising:

supporting means (4, 5, 6) cooperating with a selected part (2) to be measured, and a plurality of position transducers (27) attached to said supporting means and cooperating with discrete points of said selected part (2) to be measured, to determine any departure of said points from a theoretical position;

characterized in that said supporting means comprise a reference surface (4); a plurality of supporting elements (5) including means for adjusting the same said supporting elements so as to be able to measure each of said plurality of differently dimensioned parts to be measured, each of said supporting elements (5) including a first portion (10, 11) positioned on said reference surface (4), and a second portion (12) positioned in relation to said first portion (10) in a direction (A) perpendicular to said reference surface (4); and a plurality of measuring modules (6), one of said modules (6) being fitted to the said second portion (12) of each of said supporting elements (5), and each of said measuring modules including at least one of said transducers (27); and being further characterized in that each of said measuring modules (6) comprises: a base (24) rigidly connected to said second portion (12) of one of said supporting elements (5); an intermediate element (25) rotatable relative to said base (24) about a first axis (B); and a rest element (26) rotatable relative to said intermediate element (25) about a second axis (C) that is perpendicular to said first axis (B).

2. A gauge as claimed in claim 1, characterized in that each said rest element (26) includes a spherical lateral surface (49) cooperating with said part (2) to be measured.

3. A gauge as claimed in claim 2, characterized in that each said rest element (26) is in the form of a spherical segment having respective bases (40) perpendicular to said second axis (C); each said intermediate element (25) presenting two spaced shoulders (37) adjacent to said bases (40) of each said rest element (26); and hinge connecting means (44, 45, 46) about said second axis (C) being interposed between each said shoulders (37) and each said rest element (26).

4. A gauge as claimed in claim 3, characterized in that each said transducer (27) is housed inside a cavity (50) in each said rest element (26), and comprises a feeler element (56) movable in a diametrical direction (D) perpendicular to said second axis (C); each said feeler element (56) projecting from said lateral surface (49) of each said rest element (26) by an amount equal to the maximum detectable dimensional error.

* * * * *

UNITED STATES PATENT AND TRADEMARK OFFICE

CERTIFICATE OF CORRECTION

PATENT NO. : 5,883,313

DATED : March 16, 1999

INVENTOR(S) : Maurizio Ercole et al

It is certified that error appears in the above-indentified patent and that said Letters Patent is hereby corrected as shown below:

Page 1 of the patent, Foreign Application Priority Data, change "Oct. 6, 1995 [IT] Italy....T095A0805" to --Oct. 20, 1995 [IT] Italy....T095A000805

Signed and Sealed this

Twenty-first Day of September, 1999

Attest:

Q. TODD DICKINSON

*Attesting Officer*

*Acting Commissioner of Patents and Trademarks*

UNITED STATES PATENT AND TRADEMARK OFFICE

CERTIFICATE OF CORRECTION

PATENT NO. : 5,883,313

DATED : March 16, 1999

INVENTOR(S) : Maurizio Ercole et al.

It is certified that error appears in the above-identified patent and that said Letters Patent is hereby corrected as shown below:

This is a correction of Certificate of Correction issued on September 21, 1999 for the above-identified patent.

Front page of the patent, Foreign Application Priority Data, change "Oct. 6, 1995 [IT] Italy....T095A0805" to --Oct. 20, 1995 [IT] Italy....T09A000850--.

Signed and Sealed this

Twenty-eighth Day of November, 2000

Attest:

Q. TODD DICKINSON

*Attesting Officer*

*Director of Patents and Trademarks*

UNITED STATES PATENT AND TRADEMARK OFFICE

CERTIFICATE OF CORRECTION

PATENT NO. : 5,883,313
DATED : March 16, 1999
INVENTOR(S) : Maurizio Ercole et al.

It is certified that error appears in the above-identified patent and that said Letters Patent is hereby corrected as shown below:

Title page,
Item [30], Foreign Application Priority Data, change
"Oct. 6, 1995 [IT] Italy....T095A0805" to
-- Oct. 20, 1995 [IT] Italy....T095A000850 --

This certificate supersedes Certificate of Correction issued November 28, 2000.

Signed and Sealed this

Twenty-second Day of July, 2003

JAMES E. ROGAN
*Director of the United States Patent and Trademark Office*